United States Patent
Song (10) Patent No.: US 7,523,960 B2
(45) Date of Patent: Apr. 28, 2009

(54) CUSHION OF AIR BAG MODULE (75) Inventor: June Young Song, Sungnam-si (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 293 days.

(21) Appl. No.: 11/425,937

(22) Filed: Jun. 22, 2006

(65) Prior Publication Data
US 2007/0138773 A1 Jun. 21, 2007

(30) Foreign Application Priority Data
Dec. 15, 2005 (KR) .................. 10-2005-0123960

(51) Int. Cl.
B60R 21/26 (2006.01)
B60R 21/16 (2006.01)
(52) U.S. Cl. ...................... 280/740; 280/729
(58) Field of Classification Search ........... 280/729, 280/740, 736, 730.2, 742, 739
See application file for complete search history.

(56) References Cited

U.S. PATENT DOCUMENTS

| 5,575,497 | A | * | 11/1996 | Suyama et al. | ........... 280/730.1 |
|---|---|---|---|---|---|
| 6,206,417 | B1 | * | 3/2001 | Soderquist et al. | .......... 280/736 |
| 6,254,121 | B1 | * | 7/2001 | Fowler et al. | ............... 280/729 |
| 6,361,067 | B1 | * | 3/2002 | Varcus et al. | ............... 280/729 |
| 6,382,662 | B1 | * | 5/2002 | Igawa | ......................... 280/729 |
| 6,840,535 | B2 | | 1/2005 | Kim et al. | |
| 6,843,501 | B1 | | 1/2005 | Koh | |
| 6,935,653 | B2 | | 8/2005 | Koh | |
| 6,955,240 | B2 | | 10/2005 | Ahn et al. | |
| 7,000,943 | B2 | * | 2/2006 | Hasebe et al. | ............... 280/729 |
| 7,066,486 | B2 | | 6/2006 | Lee | |
| 7,090,244 | B2 | | 8/2006 | Lim | |
| 7,328,915 | B2 | * | 2/2008 | Smith et al. | ................. 280/739 |
| 2005/0082807 | A1 | | 4/2005 | Kwon | |

* cited by examiner

Primary Examiner—John Q. Nguyen
Assistant Examiner—Nicole Verley
(74) Attorney, Agent, or Firm—Greenblum & Bernstein, P.L.C.

(57) ABSTRACT

The cushion of an air bag module includes a first chamber part which deploys to one side of an occupant by a high pressure gas of an inflator, a second chamber part which is formed to communicate with the first chamber part and deploys to the other side of the occupant by the high pressure gas in the first chamber part, an inner pocket which is mounted on an inner side of the first chamber part to introduce gas from the inflator and has a plurality of vent holes to emit the gas into the first chamber part, and a diffuser provided at the vent holes of the inner pocket so that the gas emitted from the inner pocket forms an eddy current at a side of the second chamber part.

12 Claims, 6 Drawing Sheets

CUSHION OF AIR BAG MODULE

This Nonprovisional application claims priority under 35 U.S.C. § 119(a) on patent application Ser. No. 10-2005-0123960 filed in Korea on Dec. 15, 2005, the entire contents of which are hereby incorporated by reference.

BACKGROUND OF THE INVENTION

1. Field of the Invention

The present invention relates to an air bag module of an air bag system for a vehicle, and more particularly, to a cushion of an air bag module which can normally deploy the cushion and prevent a deployment time delay phenomenon by enhancing the flow of gas supplied into the cushion.

2. Description of the Background Art

Generally, an air bag system for a vehicle is a safety device for inflating an air bag module like a balloon upon the occurrence of a vehicle collision to thus alleviate an impact to a passenger and prevent the passenger from being thrown out of the vehicle by the cushioning action of an air bag module.

Such an air bag system for a vehicle is classified into a number of types, including a driver air bag (DAB) and a passenger air bag (PAB) for protecting front seat passengers at the time of a front collision of a vehicle and a side air bag (SAB) for protecting a passenger in the ribs at the time of a side collision of a vehicle.

In the aforementioned air bag system for a vehicle, the deployment pattern of the air bag module is determined according to the movement direction of a human body at the time of a vehicle collision. Typically, the driver air bag and the passenger air bag are designed to have a near-round deployment pattern, while the side air bag is designed to have a linear deployment pattern.

Figure 1:
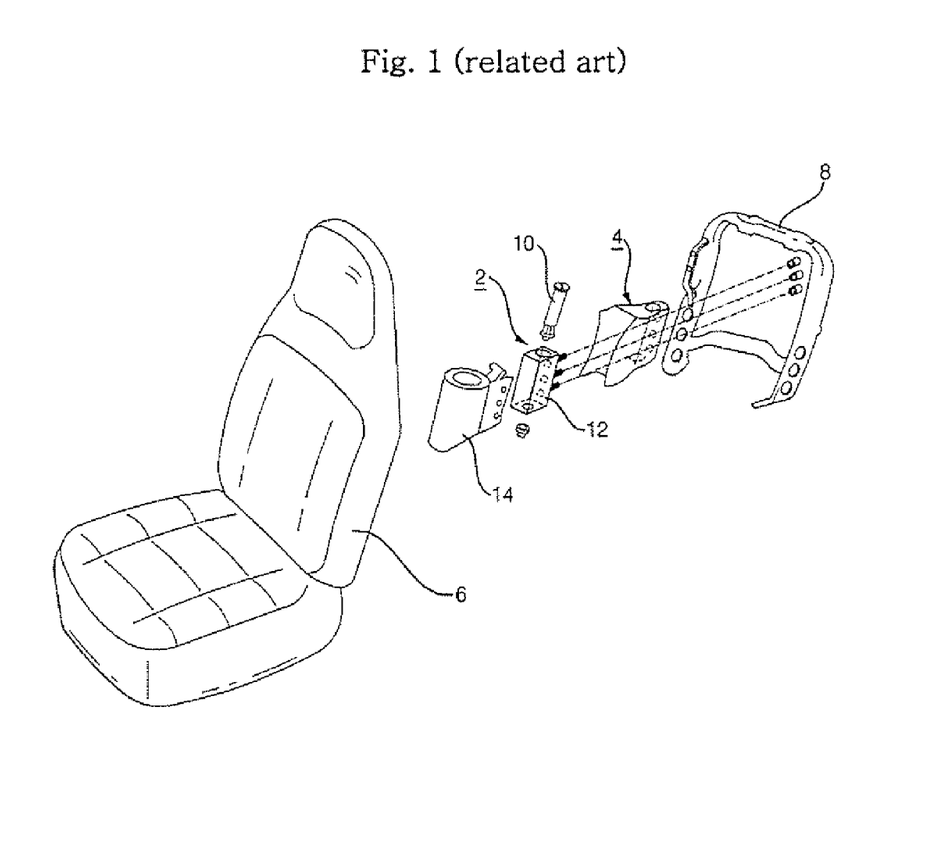
FIG. 1 is an exploded perspective view showing a mounting structure of a conventional side air bag for a vehicle.

FIG. 1 is an exploded perspective view showing a mounting structure of a conventional side air bag for a vehicle.

As shown in FIG. 1, the conventional side air bag for a vehicle includes an air bag module 2 for protecting an occupant of the vehicle and an air bag housing 4 for storing the air bag module 2 and being mounted to a seat frame 8 of a seat back 6.

The air bag module 2 includes an inflator 3 for generating a high pressure gas in the event of a vehicle collision, an inflator housing 12 having the inflator 10 installed therein, and a cushion 14 made of a fabric and deploying toward a passenger upon being supplied with the high pressure gas from the inflator 10.

Figure 2:
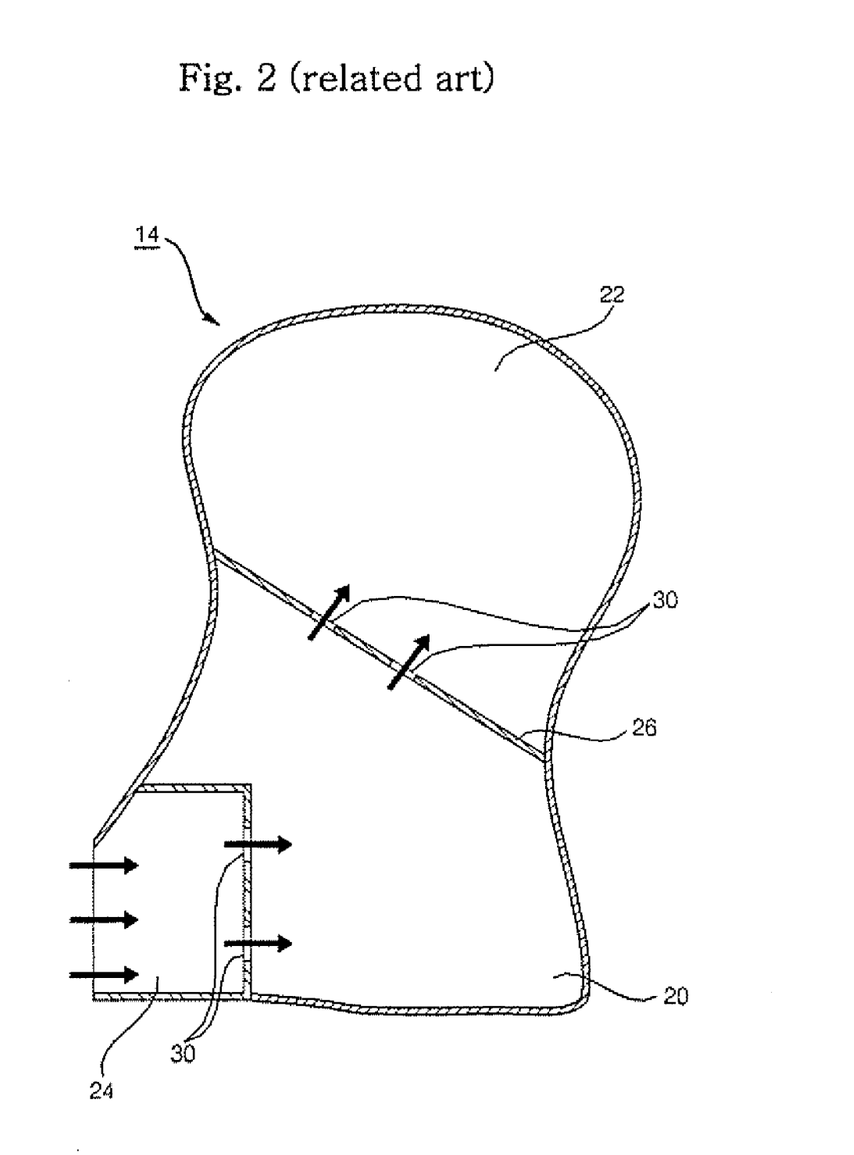
FIG. 2 is a cross sectional view showing a cushion of an air bag module according to the prior art.

FIG. 2 is a cross sectional view shoving a cushion of an air bag module according to the prior art.

The cushion 14 of the air bag module 2 according to the prior art is provided with a thorax chamber 20 which deploys toward the chest of the occupant, a head chamber part 22 which is formed to communicate with the thorax chamber part 20 and deploys toward the head of the occupant upon being supplied with gas in the thorax chamber part 20, and an inner pocket 24 which is mounted on an inner side of the thorax chamber part 20 for introducing a high pressure gas from the inflator 10, and which has vent holes 30 for emitting the gas into the thorax chamber part 20.

A barrier 26 is formed between the thorax chamber part 20 and the head chamber part 22, and the barrier 26 has a plurality of through holes 30 for supplying the gas in the thorax chamber part 20 into the head chamber part 22.

In this manner, the cushion 14 of the air bag module 2 is formed in a dual chamber structure such that damage to the cushion 14 can be prevented and the cushion 14 can deploy to a proper position according to the movement direction of the occupant in the event of a vehicle collision.

The operation of the thus-formed cushion of the air bag module according to the prior art will be described below.

Firstly, in the event of an accident, such as a collision or turnover of a vehicle, the accident, such as a collision or turnover, is sensed by a collision sensor (not shown) installed in the vehicle, and then a sensing signal is transmitted to an electronic control unit (not shown) of the vehicle, and a side air bag for a vehicle is operated by the signal of the electronic control unit.

In other words, when a side collision of a vehicle is sensed by the collision sensor, a high pressure gas is generated by the inflator 10 that has receive a signal from the electronic control unit, the high pressure gas is delivered to the inner pocket 24 in the thorax chamber part 20, and the gas decelerated or compressed in the inner pocket 24 is emitted into of the thorax chamber part 20 through the vent holes 30.

The thorax chamber part 20 deploys toward the chest of the occupant by the high pressure gas, the gas emitted into the thorax chamber part 20 is delivered into the head chamber part 22, and the head chamber part 22 deploys toward the head of the occupant.

However, in the cushion 14 of the air bag module 2 according to the prior art, since the thorax chamber part 20 directly deploys toward the chest of the occupant by the dynamic pressure of the gas emitted from the inner pocket 24, or the head chamber unit 22 deploys in a different direction than that of the gas emitted from the inner pocket 24, the gas is supplied into the head chamber part 22 at the point of time when the deployment of the thorax chamber part 20 is almost finished.

That is, the static pressure of the gas emitted into the thorax chamber part 20 reaches more than a predetermined value, the head chamber part 22 deploys toward the head of the occupant by the dynamic pressure of the gas introduced through the through holes 30 of the barrier 26.

As seen from above, the cushion 14 of the air bag module 2 is problematic in that it is not possible to deploy the head chamber part 22 until the static pressure of the gas emitted into the thorax chamber part 20 reaches a predetermined value, and the static pressure is converted into a dynamic pressure in the direction of the head chamber part 22 after the dynamic pressure of the gas is converted into a static pressure in the thorax chamber part 20, thereby causing an energy loss.

Moreover, the loss of mechanical energy occurs in the procedure of the gas flowing into the head chamber part 22 from the inner pocket 24, and hence the head chamber part 22 does not deploy smoothly and the deployment time of the head chamber part 22 is delayed.

As above, if the head chamber part 22 is not deployed in a precise shape at a proper time, the driver and the passenger are not effectively protected by the air bag module 2 in the event of a vehicle collision, which deteriorates the reliability and merchantability of the air bag system for a vehicle.

SUMMARY OF THE INVENTION

The present invention is directed to solve the prior art problems, and has for its object to provide a cushion of an air bag module which can smoothly switch the flow direction of gas and reduce the loss of dynamic energy when the direction of the gas is switched by forming an eddy current of the gas within the cushion.

It is another object of the present invention to provide a cushion of an air bag module which can improve the deployment performance of the cushion and shorten the deployment time of the cushion as the gas supplied into the cushion smoothly flows in diverse directions It is yet another object of the present invention to provide a cushion of an air bag module which can improve the reliability and merchantability of an air bag system for a vehicle by deploying the cushion to various positions of an occupant in the event of a vehicle collision.

In order to solve the above-described problems, there is provided a cushion of an air bag module in accordance with the present invention, including: a first chamber part which deploys to one side of an occupant by a high pressure gas of an inflator; a second chamber part which is formed to communicate with the first chamber part and deploys to the other side of the occupant by the high pressure gas in the first chamber part; an inner pocket which is mounted on an inner side of the first chamber part for introducing gas from the inflator and has vent holes for emitting the gas into the first chamber part; and a diffuser provided at the vent holes of the inner pocket so that the gas emitted from the inner pocket forms an eddy current at the side of the second chamber part.

The vent holes are formed in plural number at the inner pocket, and the diffuser is formed at at least one of the plurality of vent holes so that the flow velocity of the gas emitted from the vent holes can increase as the diffuser becomes farther from the second chamber part.

The diffuser is constructed in a tubular shape in which the inlet is connected to the vent holes and the outlet projects to the inside of the first chamber part.

The diffuser is formed in an inflatable nozzle structure in which the cross sectional area extends as the diffuser goes toward the outlet from the inlet.

If the flow velocity of the gas emitted through the vent holes is greater than a supersonic velocity, the diffuser is provided at the vent holes formed at a position far from the second chamber part.

On the other hand, if the flow velocity of the gas emitted through the vent holes is greater than a supersonic velocity, the diffuser is provided at the vent holes formed at a position close to the second chamber part.

The diffuser is provided at two or more of the plurality of vent holes so that the cross sectional area of the outlet becomes larger as the diffuser becomes farther from the second chamber part.

A barrier is formed between the first chamber part and the second chamber part, and a plurality of through holes through which gas passes are formed at the barrier.

The first chamber part has a round-shaped eddy current induction part which induces an eddy current of the gas to a region opposed to the vent holes.

The first chamber part is a thorax chamber part which deploys toward the chest of the occupant, while the second chamber part is a head chamber part which deploys toward the head of the occupant.

The diffuser is formed of the same fabric material as the inner pocket is, and thus the inlet thereof is sewn to the inner pocket so as to communicate with the vent holes.

DETAILED DESCRIPTION OF THE PREFERRED EMBODIMENTS

Hereinafter, embodiments of the present invention will now be described in detail with reference to the accompanying drawings.

Figure 3:
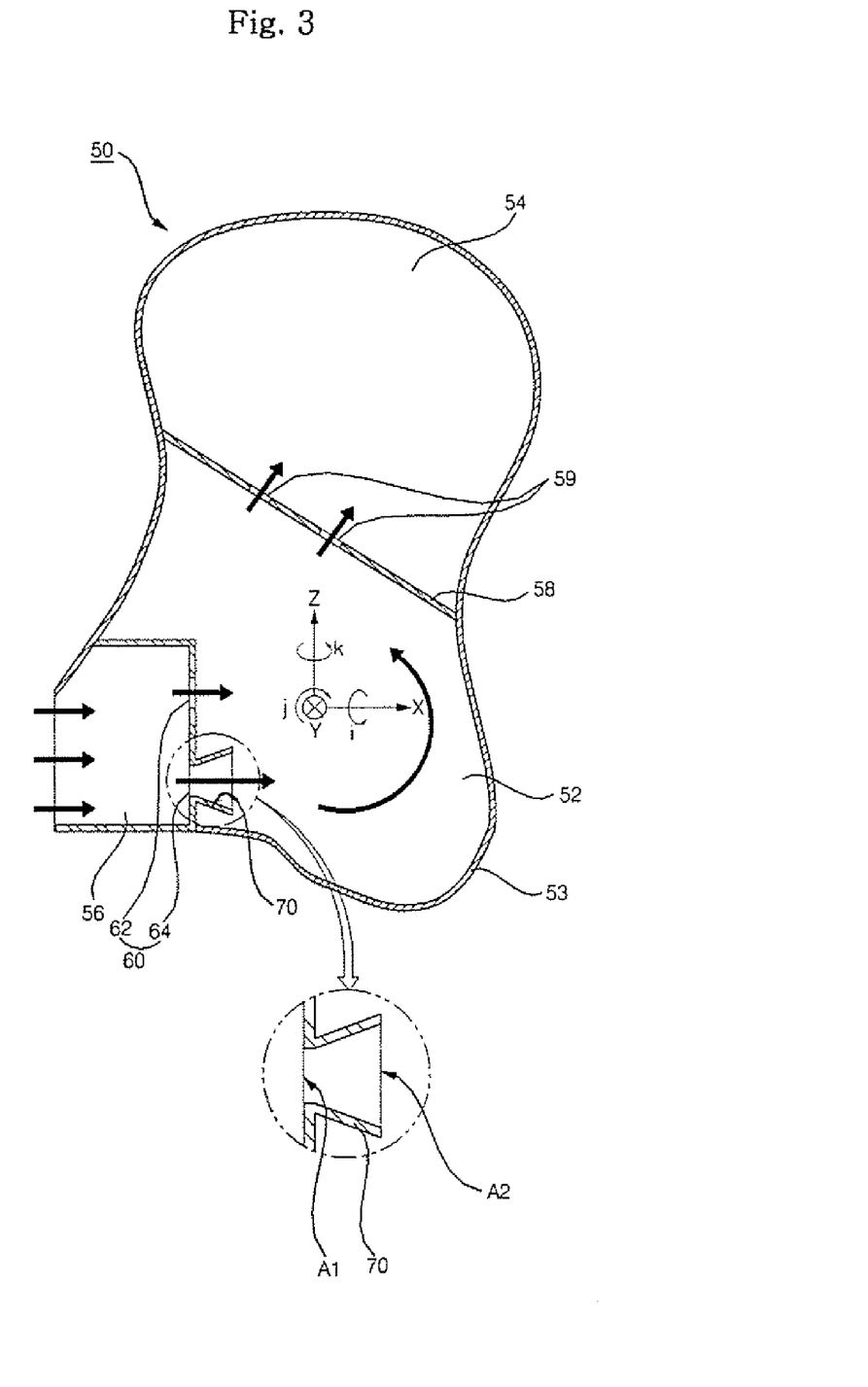
FIG. 3 is a cross sectional view showing a cushion of an air bag module in accordance with a first embodiment of the present invention.
Figure 6:
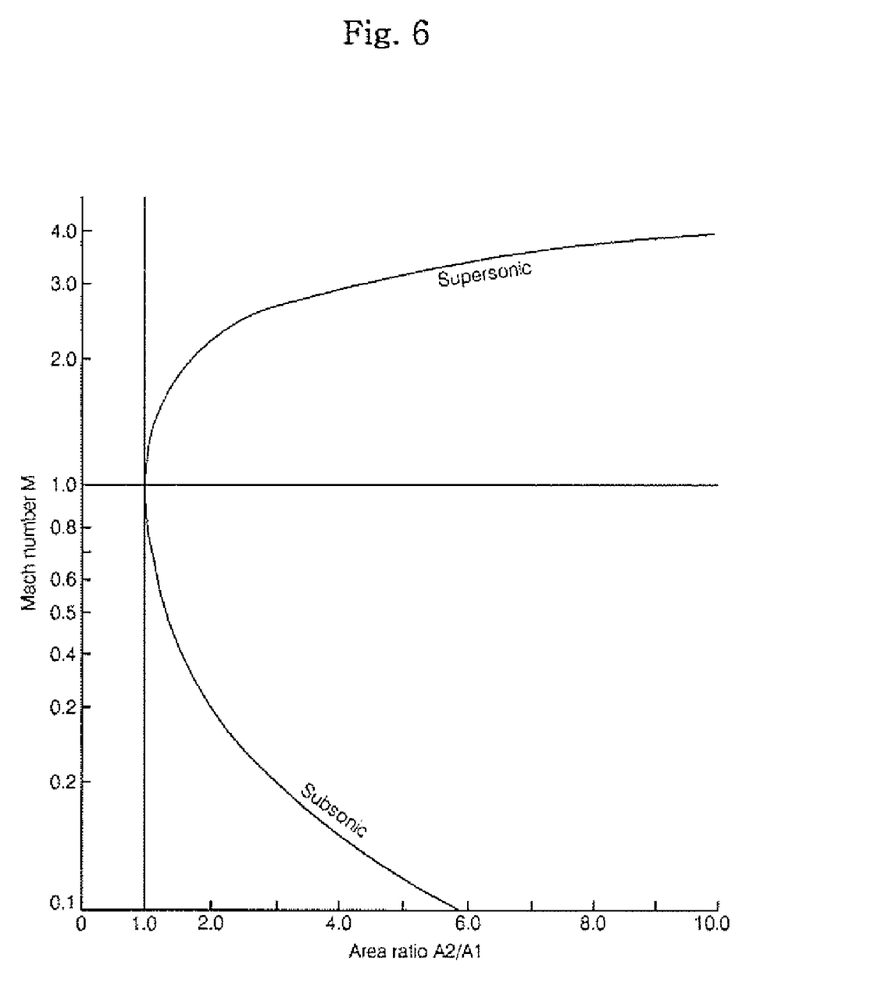
FIG. 6 is a reference diagram for explaining the shape and forming position of a diffuser provided in FIGS. 3 to 5, which is a graph about the Mach number of an outlet with respect to the area ratio of inlet to outlet of the diffuser.

FIG. 3 is a cross sectional view showing a cushion of an air bag module in accordance with a first embodiment of the present invention. FIG. 6 is a reference diagram for explaining the shape and forming position of a diffuser provided in FIGS. 3 to 5, which is a graph about the Mach number of an outlet With respect to the area ratio of inlet to outlet of the diffuser.

For reference, the same reference numerals are used for the components same as those used in the prior art.

As shown in FIG. 3, the cushion of an air bag module in accordance with the first embodiment of the present invention includes: a first chamber part 52 which deploys to one side of an occupant by a high pressure gas delivered from an inflator 10; a second chamber part 54 which is formed to communicate with the first chamber part 52 and deploys to the other side of the occupant by the high pressure gas in the first chamber part 52; an inner pocket 56 which is mounted so on an inner side of the first chamber part 52 so as to introduce a high pressure gas from the inflator 10, and which has vent holes 60 for emitting the gas into the first chamber part 52; and a diffuser 70 provided at the vent holes 60 of the inner pocket 56 so that an eddy current of the gas is formed inside the second chamber part 52.

A barrier 58 is formed between the first chamber part 52 and the second chamber part 54, and the barrier 58 has a plurality of through holes 59 for supplying the gas in the first chamber part 52 into the second chamber part 54. Accordingly, the cushion 50 is formed in a dual chamber structure in which the inside thereof is partitioned into the first chamber part 52 and the second chamber part 54 by the barrier 58.

Hereinafter, this embodiment will be described limited to a case in which the cushion 50 is used for the air bag module of a side air bag. That is, the first chamber part 52 is a thorax chamber part which deploys toward the chest of the occupant by a high pressure gas emitted from the inner pocket 56, while the second chamber part 54 is a head chamber part which deploys toward the head of the occupant by the gas in the first chamber part 52 after the deployment of the first chamber part 52.

The first chamber part 52 has a round-shaped eddy current induction part 53 which induces an eddy current to a region opposed to the vent holes 60 of the inner pocket 56 so that the gas emitted through the vent holes 60 and the diffuser 70 is switched in a direction of the through holes 59 of the barrier 58. Therefore, the flow direction of part of the gas emitted through the vent holes 60 and the diffuser 70 is switched toward the through holes 59 by the eddy current induction part 531 and hence an eddy current is formed within the first chamber part 52 by the gas whose direction is switched and which flows.

The inner pocket 56 is a pocket-shaped member whose one side is opened, one side being connected to the region that introduces the gas of the first chamber for communicating therewith and the opposite side of the one side having a plurality of vent holes 60.

The vent holes 60 consist of a first vent hole formed at the inner pocket 56 at a position close to the through holes 59 and a second vent hole 64 formed at the inner pocket 56 at a position far from the through holes 59.

It is needless to say that the first vent hole 62 or the second vent hole 64 can be formed in plural number at the inner pocket 56.

The diffuser 70 is formed in a round tube shape at the second vent hole 64, that is, the diffuser 70 is formed in a structure in which the inlet thereof is connected to the second vent hole 64 and the outlet thereof projects to the inside of the first chamber part 52.

The diffuser 70 is formed of the same fabric material as the inner pocket 56, and the inlet thereof is sewn to the inner pocket 56 so as to communicate with the second vent hole 64.

It is preferred that the inlet of the diffuser 70 and the vent holes 60 have the same shape and cross sectional area, and it is needless to say that they can be formed in various cross sectional shapes excluding a round shape.

FIG. 6 illustrates the Mach number M of the gas emitted to the outlet according to the area ratio of an inlet cross sectional area A1 of the diffuser 70 to an outlet cross sectional area A2 thereof. If the flow velocity of the gas emitted through the vent holes 60 is greater than a supersonic velocity, the area ratio A2/A1 of the diffuser 70 increases and thus the Mach number M also increases. On the other hand, if the flow velocity of the gas emitted through the vent holes 60 is less than a supersonic velocity, the area ratio A2/A1 of the diffuser 70 increases and thus the Mach number M decreases.

This embodiment will be described with respect to a case where the gas is emitted through the vent holes 60 at a flow velocity greater than a supersonic velocity.

Therefore, the diffuser 70 is formed in an inflatable nozzle structure in which its outlet cross sectional area A2 extends more than its inlet cross sectional area A1 does so that the flow velocity of the gas emitted from the second vent hole 64 is higher than the flow velocity of the gas emitted from the first vent hole 62.

As seen from above, if the area ratio A2/A1 of the diffuser 70 has a value greater than 1, because the flow velocity of the gas emitted through the second vent hole 64 and the diffuser 70 is higher than the flow velocity of the gas emitted through the first vent hole, a velocity gradient is formed in the direction of becoming far from the second chamber part 54. Due to the velocity gradient of the gas, an eddy current is formed within the first chamber part 52, and the flow direction of the gas emitted into the first chamber part 52 by the eddy current is naturally switched toward the through holes 59 of the second chamber part 54.

Especially, as the outlet cross sectional area A2 of the diffuser 70 increases and decreases, the flow velocity of the gas emitted through the outlet of the diffuser 70 also increases and decreases. Thus, by changing the outlet cross sectional area A2 of the diffuser 70, the velocity gradient in the first chamber part 52 is changed, thereby making it possible to control the strength of the eddy current.

The operation and operational effects of the thus-formed cushion of an air bag module in accordance with the first embodiment of the present invention will be described below.

First, a high pressure gas generated from the inflator 10 in the event of a vehicle collision or turnover is supplied into the inner pocket 56, the gas decelerated and compressed in the inner pocket 56 is emitted to the first chamber part 52 through the vent holes 60 and the diffuser 70, and the first chamber part 52 deploys toward the chest of the occupant by the emitted gas.

At this time, since the flow velocity of the gas emitted through the second vent hole 64 and the diffuser 70 is higher than the flow velocity of the gas emitted through the first vent hole 62 of the vent holes 60, a velocity gradient of the gas in which the flow velocity increases in the direction of becoming far from the second chamber part 54 is formed in the first chamber part 52.

Due to the velocity gradient of the gas, an eddy current is formed within the first chamber part 52 in the direction of the second chamber part 54. Of course, the gas emitted to the first chamber part 52 through the first vent hole 62 and the diffuser 70 is induced in the direction of the second chamber part 54 by the eddy current induction part 53 of the first chamber part 52, and hence an additional eddy current is generated in the first chamber part 52.

Once an eddy current is generated in the first chamber part 54 as above, the flow direction of the gas emitted into the first chamber part 52 is smoothly switched to the direction of the second chamber part 54, and flows and is supplied into the second chamber part 54 through the through holes 59 formed at the barrier 58 between the first chamber part 52 and the second chamber part 54, and the second chamber part 54 deploys toward the head of the occupant by the gas supplied through the through holes 59.

The procedure in which the eddy current is generated and acts in the first chamber part 52 will be described in detail with reference to FIGS. 3 and 6 and the following mathematical formula 1.

[Mathematical Formula 1]
$$\zeta = \left(\frac{\partial w}{\partial y} - \frac{\partial v}{\partial z}\right)i + \left(\frac{\partial u}{\partial z} - \frac{\partial w}{\partial x}\right)j + \left(\frac{\partial v}{\partial x} - \frac{\partial u}{\partial y}\right)k$$

$\zeta$: eddy current
u: flow velocity of gas in X-axis direction
v: flow velocity of gas in Y-axis direction
w: flow velocity of gas in Z-axis direction As shown in FIG. 3, if an X-axis, Y-axis and Z-axis are set in the cushion 50, an eddy current $\zeta$ corresponding to Mathematical Formula 1 is generated in the fist chamber part 52 according to the velocity gradient of the gas discharged through the first vent hole 62 and the diffuser 70.

That is, the gas emitted through the first vent hole 62 and the diffuser 70 flows in the X-axis direction and the flow velocity thereof decreases in the Z-axis direction, and thus "$\partial u/\partial z$" shown in Mathematical Formula 1 has a much greater negative value than other terms. Hence, an eddy current $\zeta$ is generated in an anticlockwise direction in the first chamber part 52.

As above, if an eddy current $\zeta$ is generated in the first chamber part 52, the flow direction of most of the gas emitted through the first vent hole 62 and the diffuser 70 is naturally switched toward the through holes 59 by the eddy current $\zeta$ phenomenon.

Therefore, the first chamber part 52 deploys by the dynamic pressure of the gas in the same way as the prior art, while the second chamber part 54 directly deploys by the dynamic pressure of the gas whose direction is switched by the eddy current $\zeta$ unlike the prior art.

In the present invention, the procedure of changing the gas from a dynamic pressure to a static pressure and then converting it from the static pressure to the dynamic pressure is mostly omitted, thus the loss of dynamic energy of the gas is minimized, and the deployment time of the second chamber part 54 is shortened.

Of course, after the conversion from a dynamic pressure to a static pressure, when the static pressure increases by a predetermined value as the first chamber part 52 inflates, the rest of the gas emitted through the first vent hole 62 and the diffuser 70 is converted to a dynamic pressure having a velocity component in the direction of the through holes 59, thereby deploying the second chamber part 54.

Figure 4:
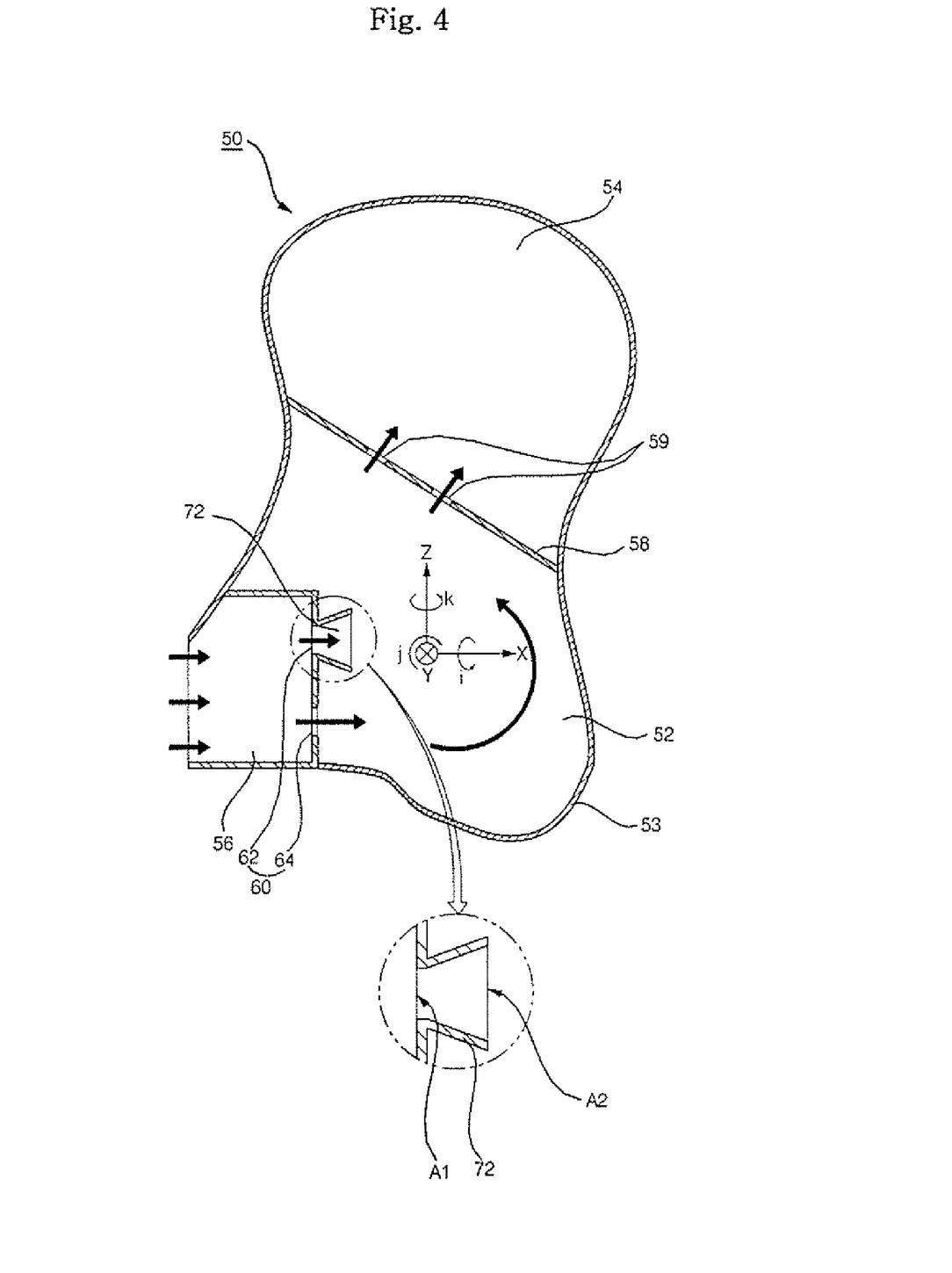
FIG. 4 is a cross sectional view showing a cushion of an air bag module in accordance with a second embodiment of the present invention.

FIG. 4 is a cross sectional view showing a cushion of an air bag module in accordance with a second embodiment of the present invention.

For reference, like reference numerals are used to designate elements corresponding to those described in the first embodiment of the present invention, thus a detailed description thereof will be omitted.

As shown in FIG. 4, in the cushion of an air bag module in accordance with the second embodiment of the present invention, gas is emitted at a flow velocity less than a supersonic velocity through first and second vent holes 62 and 64 of an inner pocket 56, and a diffuser 72 is formed in an inflatable nozzle structure in which its outlet cross sectional area A2 extends more than its inlet cross sectional area A1 does so that the flow velocity of the gas emitted from the second vent hole 64 is higher than the flow velocity of the gas emitted from the first vent hole 62. Other elements are constructed in the same manner as the first embodiment.

That is, a plurality of vent holes 60 is formed at the inner pocket 56. The vent holes consist of a first vent hole 62 formed at the inner pocket 56 at a position close to the through holes 59 and a second vent hole 64 formed at the inner pocket 56 at a position far from the through holes 59.

The diffuser 72 is formed in a round tube shape at the first vent hole 62, that is, the diffuser 72 is formed in a structure in which the inlet thereof is connected to the first vent hole 62 and the outlet thereof projects to the inside of the first chamber part 52.

The diffuser 72 is formed of the same fabric material as the inner pocket 56, and the inlet thereof is sewn to the inner pocket 56 so as to communicate with the first vent hole 62.

It is preferred that the inlet of the diffuser 72 and the vent holes 60 have the same shape and cross sectional area, and it is needless to say that they can be formed in various cross sectional shapes excluding a round shape.

As shown in FIG. 6, if the flow velocity of the gas emitted through the vent holes 60 is less than a supersonic velocity, and the area ratio A2/A1 of the diffuser 72 has a value greater than 1, because the flow velocity of the gas emitted through the first vent hole 62 and the diffuser 72 is lower than the flow velocity of the gas emitted through the second vent hole 64, a velocity gradient is formed in the direction of becoming far from the second chamber part 54.

Due to the velocity gradient of the gas, an eddy current is formed within the first chamber part 52, and the flow direction of the gas emitted into the first chamber part 52 by the eddy current is naturally switched toward the through holes 59 of the second chamber part 54.

Especially, as the outlet cross sectional area A2 of the diffuser 70 increases and decreases, the flow velocity of the gas emitted through the outlet of the diffuser 70 also increases and decreases. Thus, by changing the outlet cross sectional area A2 of the diffuser 70, the velocity gradient in the first chamber part 52 is changed, thereby making it possible to control the strength of the eddy current.

Figure 5:
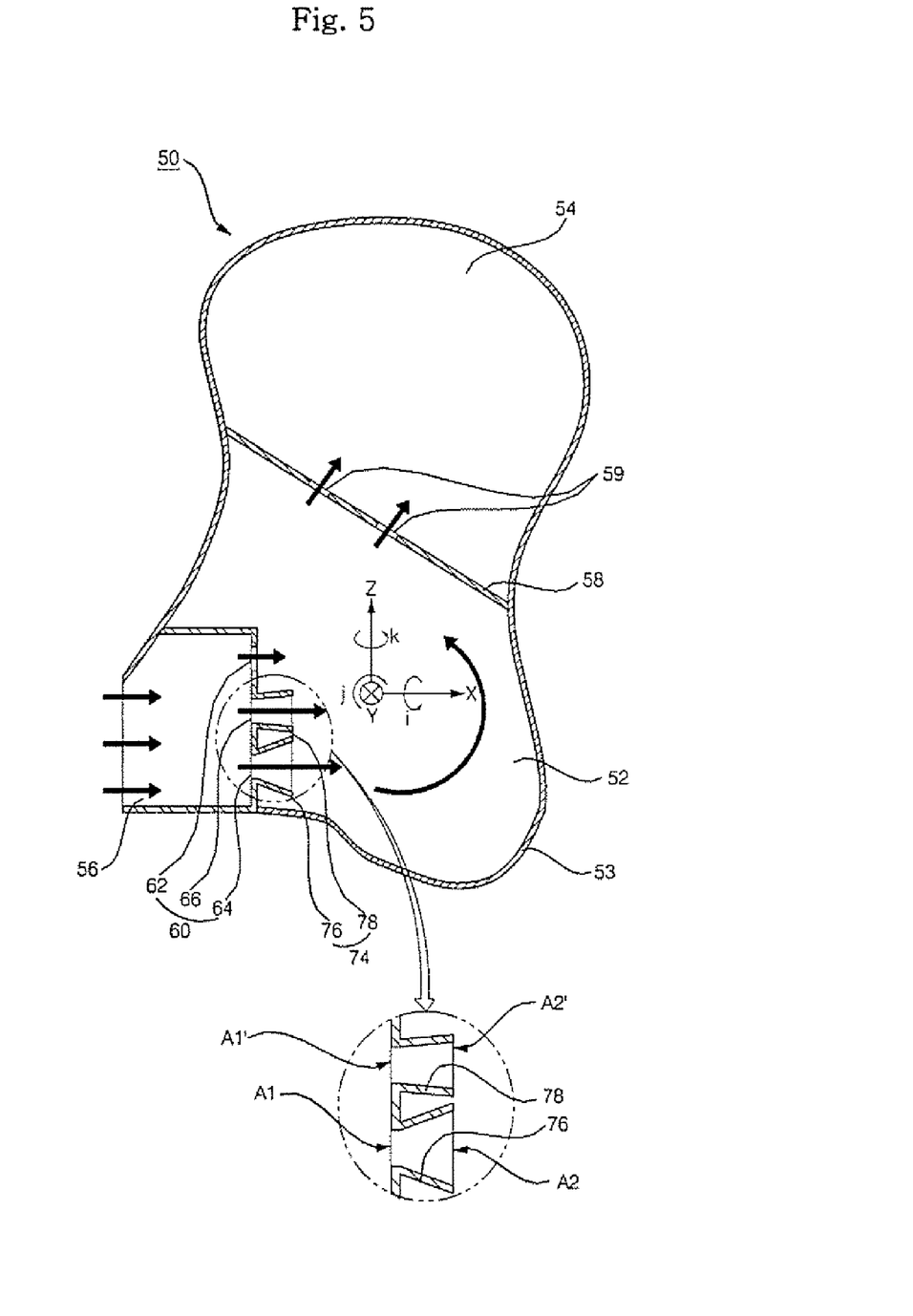
FIG. 5 is a cross sectional view showing a cushion of an air bag module in accordance with a third embodiment of the present invention.

FIG. 5 is a cross sectional view showing a cushion of an air bag module in accordance with a third embodiment of the present invention.

For reference, like reference numerals are used to designate elements corresponding to those described in the first embodiment of the present invention, thus a detailed description thereof will be omitted.

As shown in FIG. 5, in the cushion of an air bag module in accordance with the third embodiment of the present invention, an inner pocket 56 has a plurality of vent holes 60 spaced apart at through holes 59 of a barrier 58, and a diffuser 74 is provided at two or more of the vent holes 60 so that the flow velocity of the gas emitted from the vent holes 60 can increase as the gas becomes farther from the second chamber part 54. Other elements are constructed in the same manner as the first embodiment.

With respect to the plurality of diffusers 74, if the flow velocity of the gas emitted through the vent holes 0 is greater than a supersonic velocity, the cross sectional area of the outlet becomes relatively greater as they become farther from the second chamber part 54, while if the flow velocity of the gas emitted through the vent holes 60 is less than a supersonic velocity, the cross sectional area of the outlet becomes relatively smaller than they become farther from the second chamber part 54.

The vent holes 60 are formed in plural number at the inner pocket 56 so as to be spaced a predetermined distance in the Z-axis direction.

Hereinafter, this embodiment will be described with respect to a case where three vent holes 60 are formed at different positions of the inner pocket 56 and the flow velocity of the gas emitted through the vent holes 60 is greater than a supersonic velocity for the convenience of description.

The vent holes 60 consist of a first vent hole 62 formed at the inner pocket 56 at a position close to the through holes 59, a second vent hole 64 formed at the inner pocket 56 at a position far from the through holes 59, and a third vent hole 66 formed at the inner pocket 56 so as to be arranged in the middle between the second vent hole 64 and the first vent hole 62.

It is needless to say that the aforementioned first vent hole 62, second vent hole 64 and third vent hole 66 may be formed in plural number at the inner pocket 56.

Each of the diffusers 74 is formed in a round tube shape at the second vent hole 64 and the third vent hole 66, that is, each of the diffusers 74 is formed in a structure in which the inlet thereof is connected to the second vent hole 64 and the outlet thereof projects to the inside of the first chamber part 52.

That is, the diffusers 74 consist of a first diffuser 76 formed at the second vent hole 64 in an inflatable nozzle structure in which its outlet cross sectional area A2 extends more than its inlet cross sectional area A1 does and a second diffuser 78 formed at the third vent hole 66 in an inflatable nozzle structure in which its inlet cross sectional area A' extends more than its outlet cross sectional area A2' so that the area ratio A2'/A1' is smaller than the area ratio A2/A1 of the first diffuser 76.

The gas emitted through the second diffuser 78 has a higher flow velocity than the gas emitted through the first vent hole 62, and the gas emitted through the first diffuser 76 has a higher flow velocity than the gas emitted through the second diffuser 78.

Therefore, a velocity gradient is formed in the direction of becoming far from the second chamber part 54. Due to the velocity gradient of the gas, an eddy current is formed within the first chamber part 52, and the flow direction of the gas is naturally switched toward the through holes 59 of the second chamber part 54.

The first diffuser 76 and the second diffuser 78 are formed of the same fabric material as the inner pocket 56, and the inlet thereof is sewn to the inner pocket 56 so as to communicate with the second vent hole 64 and the third vent hole 66, respectively.

Especially, as the outlet cross sectional areas A2 and A2' of the first diffuser 76 and second diffuser 78 increase and decrease, the flow velocity of the gas emitted through the outlets of the first diffuser 76 and second diffuser 78 also increases and decreases. Thus, by changing the outlet cross sectional area A2 and A2' of the first diffuser 76 and second diffuser 78, the velocity gradient in the first chamber part 52 is changed, thereby making it possible to control the strength of the eddy current.

Meanwhile, in the cushion 50 of an air bag module according to the present invention, if three vent holes 60 are formed at different positions of the inner pocket 56, and at the same time the flow velocity of the gas emitted through the vent holes 60 is less than a supersonic velocity, the first diffuser 76 and the second diffuser 78 are formed at the first vent hole 62 and the second vent hole 64, respectively. Therefore, a velocity gradient is formed in the first chamber part 52 in the direction of becoming far from the second chamber part 54, and a detailed description thereof will be omitted.

Although the cushion of an air bag module according to the present invention has been described with reference to the accompanying drawings, it should be understood that various modifications and equivalents may be made by those skilled in the art without departing from the spirit and scope of the invention.

In other words, in the cushion of an air bag module according to the present invention, it is needless to say that the diffuser can he formed at all of the plurality of through holes formed at the inner pocket so that the flow velocity of the gas in the first chamber part increase as the diffuser becomes farther from the second chamber part.

Furthermore, it is apparent that the cushion of an air bag module according to the present invention is not limited to a side air bag, but is applicable to all of a driver air bag, a passenger air bag, etc. formed in a dual chamber structure.

EFFECT OF THE INVENTION

The thus-formed and operated cushion of an air bag module according to the present invention is advantageous in that an eddy current is formed in the first chamber part toward the second chamber part by the diffusers provided at the vent holes of the inner pocket, and thus the flow direction of the gas emitted through the vent holes of the inner pocket is smoothly switched toward the second chamber part by the eddy current.

Moreover, since the flow direction of the gas is smoothly switched toward the second chamber part in the first chamber part by the eddy current, the loss of mechanical energy due to the switch of the direction of the gas is minimized, and the first chamber part and the second chamber part deploy effectively in different directions.

Moreover, as the gas is delivered to the second chamber part with the loss of mechanical energy minimized, the deployment time of the second chamber part is shortened, thus improving the deployment performance of the cushion.

Moreover, the above-described cushion deploys at a proper time to diverse positions of the occupant in the event of a vehicle collision, and thus the reliability and merchantability of an air bag system for a vehicle are improved.

Moreover, an eddy current is generated in a desired direction in the first chamber part by a simple change in structure, i.e., the formation of a diffuser at the vent holes, and thus the cushion is easily applicable to various kinds of air bag modules.

Moreover, because the diffuser is formed in an inflatable nozzle structure at at least one of the plurality of vent holes so that the flow velocity of the gas emitted can increase as the diffuser becomes farther from the second chamber part, it is possible to control the strength of the eddy current by a simple change in design, i.e., by adjusting the area ratio or forming position of the diffuser. Hence, the diffuser is properly designed according to the design condition of the cushion, thereby improving the design freedom.

Moreover, the first chamber part has an eddy current induction part formed at a region opposed to the vent holes, and thus an eddy current of the gas is additionally formed by the eddy current induction part.

What is claimed is:

1. A cushion of an air bag module, comprising:
    a first chamber part which deploys to one side of an occupant by a high pressure gas of an inflator;
    a second chamber part which is formed to communicate with the first chamber part and deploys to the other side of the occupant by the high pressure gas in the first chamber part;
    an inner pocket which is mounted on an inner side of the first chamber part to introduce gas from the inflator and has a plurality of vent holes to emit the gas into the first chamber part; and
    at least one diffuser provided at the vent holes of the inner pocket so that the gas emitted from the inner pocket forms an eddy current at a side of the second chamber part,
    wherein the cross sectional area of an outlet of the at least one diffuser is greater than the cross-sectional area of a respective inlet of the at least one diffuser.

2. The cushion of claim 1, wherein the plurality of vent holes are formed at the inner pocket, and a respective diffuser is formed at at least one of the plurality of vent holes so that a flow velocity of the gas emitted from the vent holes can increase as the diffuser becomes farther from the second chamber part.

3. The cushion of claim 2, wherein each diffuser is constructed in a tubular shape in which its inlet is connected to one of the vent holes and its outlet projects to an inside of the first chamber part.

4. The cushion of claim 3, wherein each diffuser is formed in an inflatable nozzle structure in which the cross sectional area increases as the diffuser goes toward the outlet from the inlet.

5. The cushion of claim 4, wherein when the flow velocity of the gas emitted through the vent holes is greater than a supersonic velocity, diffuser is provided at the vent holes formed at a position spaced from the second chamber part.

6. A cushion of an air bag module, comprising:
    a first chamber part which deploys to one side of an occupant by a high pressure gas of an inflator;
    a second chamber part which is formed to communicate with the first chamber part and deploys to the other side of the occupant by the high pressure gas in the first chamber part;
    an inner pocket which is mounted on an inner side of the first chamber part to introduce gas from the inflator and has a plurality of vent holes to emit the gas into the first chamber part; and a plurality of diffusers provided at the vent holes of the inner pocket so that the gas emitted from the inner pocket forms an eddy current at a side of the second chamber part, wherein each diffuser is constructed in a tubular shape in which an inlet is connected to one of the vent holes and an outlet projects to an inside of the first chamber part, wherein each diffuser is formed in an inflatable nozzle structure in which the cross sectional area extends as the diffuser goes toward the outlet from the inlet, wherein if the flow velocity of the gas emitted through the vent holes is greater than a supersonic velocity, the diffuser is provided at the vent holes formed at a position spaced from the second chamber part, and wherein the diffusers are provided at the plurality of vent holes so that the cross sectional area of the outlet becomes larger as each diffuser becomes farther from the second chamber part.

7. The cushion of claim 4, wherein when the flow velocity of the gas emitted through the vent holes is less than a supersonic velocity, each diffuser is provided at the vent holes formed at a position close to the second chamber part.

8. A cushion of an air bag module, comprising:

a first chamber part which deploys to one side of an occupant by a high pressure gas of an inflator;

a second chamber part which is formed to communicate with the first chamber part and deploys to the other side of the occupant by the high pressure gas in the first chamber part;

an inner pocket which is mounted on an inner side of the first chamber part to introduce gas from the inflator and has a plurality of vent holes to emit the gas into the first chamber part; and a plurality of diffusers provided at the vent holes of the inner pocket so that the gas emitted from the inner pocket forms an eddy current at a side of the second chamber part, wherein the plurality of vent holes are formed at the inner pocket, and the diffuser is formed at at least one of the plurality of vent holes so that a flow velocity of the gas emitted from the vent holes can increase as the diffuser becomes farther from the second chamber part, wherein each diffuser is constructed in a tubular shape in which an inlet is connected to one of the vent holes and an outlet projects to an inside of the first chamber part, wherein each diffuser is formed in an inflatable nozzle structure in which the cross sectional area extends as the diffuser goes toward the outlet from the inlet, wherein when the flow velocity of the gas emitted through the vent holes is less than a supersonic velocity, each diffuser is provided at the vent holes formed at a position close to the second chamber part, and wherein each diffuser is provided at the plurality of vent holes so that the cross sectional area of the outlet becomes larger as the diffuser becomes farther from the second chamber part.

9. The cushion of claim 4, wherein a barrier is formed between the first chamber part and the second chamber part, and a plurality of through holes through which gas passes are formed at the barrier.

10. The cushion of claim 4, wherein the first chamber part has a round-shaped eddy current induction part which induces an eddy current of the gas to a region thereof opposed to the vent holes.

11. The cushion of claim 4, wherein the first chamber part is a thorax chamber part which deploys toward a chest of the occupant, while the second chamber part is a head chamber part which deploys toward a head of the occupant.

12. The cushion of claim 4, wherein the diffuser is formed of the same fabric material as the inner pocket is, and thus the inlet thereof is sewn to the inner pocket so as to communicate with the vent holes.

* * * * *